United States Patent

[11] 3,586,458

| [72] | Inventor | Paul A. Avery |
| | | Shelton, Conn. |
| [21] | Appl. No. | 858,374 |
| [22] | Filed | Sept. 16, 1969 |
| [45] | Patented | June 22, 1971 |
| [73] | Assignee | Avco Corporation |
| | | Stratford, Conn. |

[54] BLEED CONTROL ACTUATOR FOR GAS TURBINE ENGINE
8 Claims, 3 Drawing Figs.

[52] U.S. Cl. ............................................. 415/28
[51] Int. Cl. .......................................... F01b 25/00
[50] Field of Search .................................... 415/28; 60/39.29

[56] References Cited
UNITED STATES PATENTS

| 2,958,457 | 11/1960 | Fox et al. | 69/39.29 |
| 2,965,285 | 12/1960 | Schorn et al. | 60/39.29 |
| 2,978,166 | 4/1961 | Hahn | 415/28 |
| 3,016,702 | 1/1962 | Ladd | 60/39.29 |
| 3,080,712 | 3/1963 | Wood | 60/39.29 |
| 3,080,713 | 3/1963 | Silver | 60/39.29 |
| 3,172,259 | 3/1965 | North, Jr. | 60/39.29 |
| 3,219,309 | 11/1965 | Alberani | 60/39.29 |

Primary Examiner—C. J. Husar
Attorneys—Charles M. Hogan and Gary M. Gron

ABSTRACT: The disclosure illustrates an actuator which controls the opening and closing of an interstage bleed valve for a gas turbine engine multistage air compressor. The actuator has a power piston and output rod adapted to close the bleed valve in response to pressurization by discharge air from the compressor. A valve assembly is provided in the actuator to control the flow to the power piston and thus control the opening and closing of the bleed valve. The valve assembly maintains the power piston in a position which opens the bleed valve in the absence of an exterior control signal for startup engine-operating conditions. The valve assembly reverses its logic for normal engine-operating conditions and maintains the power piston in a position which closes the bleed valve in the absence of an exterior control signal.

INVENTOR.
PAUL A. AVERY
BY Charles M. Hogan
Gary M. Grow
ATTORNEYS.

BLEED CONTROL ACTUATOR FOR GAS TURBINE ENGINE

This invention relates to actuators and more specifically to actuators used with bleed valves of gas turbine engines.

In recent years there has been a significant amount of development in the adaptation of electronic devices to provide the complex control logic necessary to control operating conditions of gas turbine engines for optimum performance. One of the control functions vital for safe and efficient operating conditions is the control of interstage bleed air from the compressor to eliminate compressor surge. It is extremely necessary to provide proper control of the compressor bleed valve as during engine startup. If proper bleed control is not exercised during this engine condition, compressor surge would be encountered.

One of the problems that arises when an electronic system is used to provide bleed flow control is that during the startup conditions when it is necessary to provide control, the source of electrical power for the control (generally from an engine-driven alternator) is insufficient due to the low r.p.m. of the engine.

Accordingly, it is an object of the present invention to provide a gas turbine engine bleed valve actuator which is highly efficient and simplified and enables control of bleed flow over a wide range of engine operating conditions.

The above ends are achieved by a bleed valve actuator comprising a power piston displaceable in a chamber of the actuator housing. A means acts on one face of the piston to yieldably urge it to a position where the compressor bleed valve is open. A passageway provides a flow path of pressurized air from the discharge of the gas turbine engine compressor to the piston so that, when pressurized air is present, it acts in opposition to the biasing means and urged the power piston to a position which closes the bleed valve. A valve element is positioned in the passageway to selectively block and permit flow of pressurized air to the power piston. A means is positioned in the housing and is responsive to exterior control inputs for selectively maintaining the valve element in the flow-permitting and flow-blocking conditions. The selective maintaining means is adapted, in the absence of a control input, to maintain the valve element in a flow-blocking condition for relatively low levels of compressor discharge pressure and to maintain the valve in a flow-permitting condition for relatively high levels of compressor discharge pressure.

The above and other related objects and features of the present invention will be apparent from a reading of the description of the disclosure found in the accompanying drawing and the novelty thereof pointed out in the appended claims.

Figure 1:
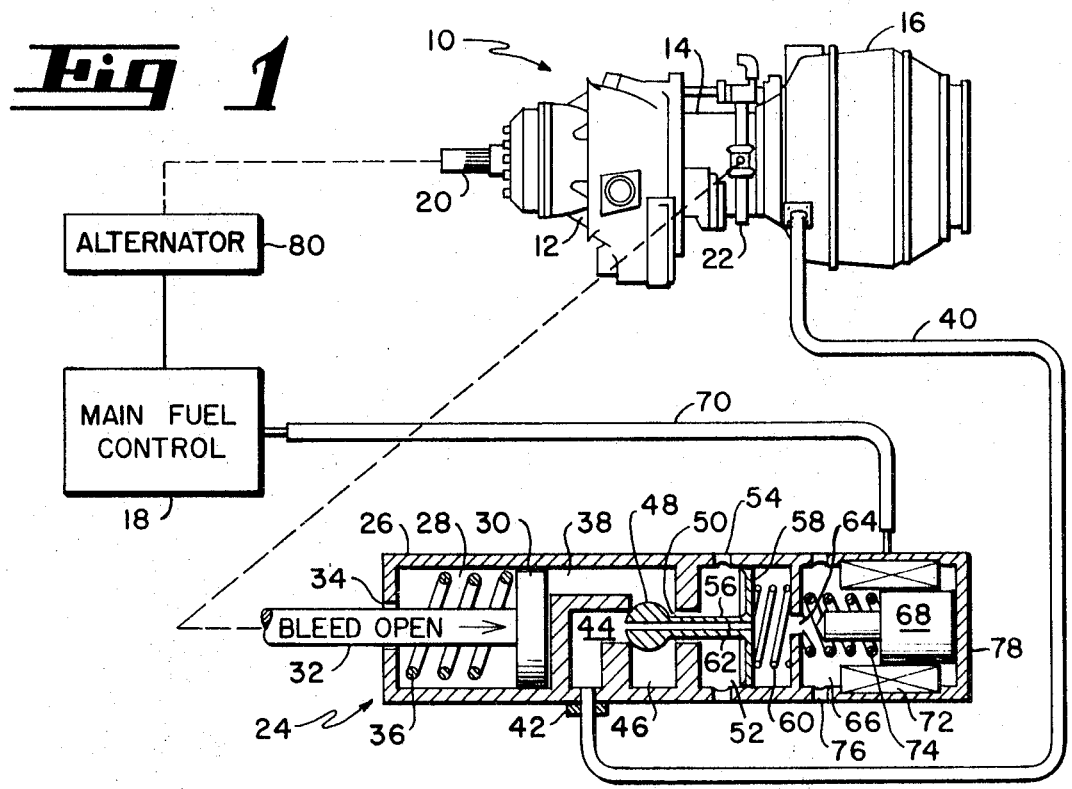
FIG. 1 is a longitudinal section view of an actuator embodying the present invention, together with the cooperating elements of a gas turbine engine having an interstage bleed valve controlled by the actuator.

In FIG. 1 there is shown a gas turbine engine 10 with which the actuator is used. Briefly, the gas turbine engine 10 receives a source of air through an intake 12 for pressurization by multistage compressor 14 and subsequent discharge to a combustor 16. Metered fuel is supplied to the combustor from a main fuel control 18 (the connections between the fuel control and the combustor not being shown to simplify the explanation of the present invention). The fuel is mixed with the pressurized air from the compressor 14 and ignited to provide a propulsive gas stream. The propulsive gas stream is discharged across a turbine (not shown) which drives a rotor of compressor 14 and across a power turbine (also not shown) which drives a power output shaft 20.

The engine 10 operates over a wide range of flow conditions and, as pointed out above, it is necessary to control bleed flow from an intermediate stage of the compressor to avoid the surge condition. For this purpose a circumferential band 22 is positioned around an intermediate stage of the compressor 14. This band, when tightened, covers a series of ports which extend directly to the airflow path through the compressor. When the band 22 is loosened the pressurized air in the compressor flow path urges the band away from the ports and the air is discharged from the compressor.

The bleed band 22 is selectively tightened and loosened by means of an actuator generally referred to by reference character 24. It should be noted that the actuator is represented in schematic fashion to aid in a clear understanding of the present invention. Consequently, there is no showing of threaded end caps and separate fabricated or a assembled elements of the actuator that make it practical to manufacture. It should be understood, however, that it is within the capabilities of those skilled in the art to provide the actuator shown in suitable components for ease of manufacture and assembly.

The actuator 24 comprises a housing 26 having a cylindrical chamber 28 formed in one end. A power piston 30 is displaceable in the chamber 28 and has an output shaft 32 extending through an opening 34 in the housing 26 to the bleed band 22 via a suitable mechanical connection. A spring 36 yieldably urges the piston 30 to a position against the right face of chamber 28 wherein the bleed band 22 is in an open position. A port 38 extends to the right face of chamber 28 so that admission of pressurized air from the discharge of the compressor 14 via supply conduit 40 urges the piston 30 in opposition to the spring 36 to a position wherein the bleed band 22 is closed.

The flow of pressurized air from conduit 40 to port 38 is via a fitting 42, an inlet port 44 and a central chamber 46. A flow control valve comprising spherical valve element 48 is displaceable in the central chamber 46 in an upstream direction against the inlet port 44 to block flow from conduit 40 to port 38 and displaceable away from port 44 to permit flow.

The valve element 48 is also adapted to be displaced against an outlet port 50 extending to a chamber 52, also formed in housing 26. A series of ports 54 provide continuous communication from the chamber 52 to a low-pressure discharge, such as the atmosphere. The flow control valve further comprises a stem portion 56 extending from the spherical element through port 50 to a piston portion 58 displaceable in chamber 52. Spring 60, acting on the right face of the piston portion 58 yieldably urges the flow control valve towards an upstream position wherein the head portion 48 blocks flow from inlet port 44.

A relatively small diameter restricted flow passage 62 extends from the upstream end of flow control valve through the spherical portion 48, the stem portion 56 to the right side of the piston portion 58. A port 64 connects the portion of the chambers 52 to the right of piston portion 58 to another chamber 66 formed in the end of housing 26. Ports 76 lead from chamber 66 to atmosphere. A plunger valve element 68 is adapted to be displaced against the port 64 by supplying of electrical energy via connection 70 to the windings of a solenoid 72. A spring 74 acts against the plunger 68 to yieldably urge it away from port 64 and against an end face 78.

The electrical connection 70 receives electrical signals from an appropriate section of the main fuel control 18. This is a usual practice in gas turbine control systems since some of the logic necessary to control fuel flow is identical to the logic necessary to control the action of the bleed valve. As pointed out later in the discussion of this invention, the main fuel control 18 sends out electrical signals to the solenoid 72 whenever it is necessary to close the bleed band 22. In addition, it is pointed out that the main fuel control 18 receives a source of electrical energy from an engine-driven alternator 80 (note the mechanical connection to the output shaft 20 of the engine).

At startup of the engine 10, the actuator 24 is in the condition indicated in FIG. 1. The power piston 30 is maintained in a position which opens bleed band 22 by the spring 36, the spring 60 maintains the head portion 48 of the valve against inlet port 44, and the spring 74 maintains the plunger 68 in a position permitting bleed flow across the valve element and through port 76 to atmosphere.

For this portion of the engine operation it is necessary to maintain the bleed band 22 in an open position to prevent compressor surge. At startup there is insufficient electrical energy available from the alternator to energize the solenoid 72 to maintain the bleed valve 22 in an open position. However, during startup conditions the pressure available from the compressor 14 a acting on the upstream end of the flow control valve is insufficient to overcome the force of spring 60. This is true even though the restricted passageway 66 through the valve element causes a pressure differential across the valve which would tend to urge it toward an open position.

Figure 2:
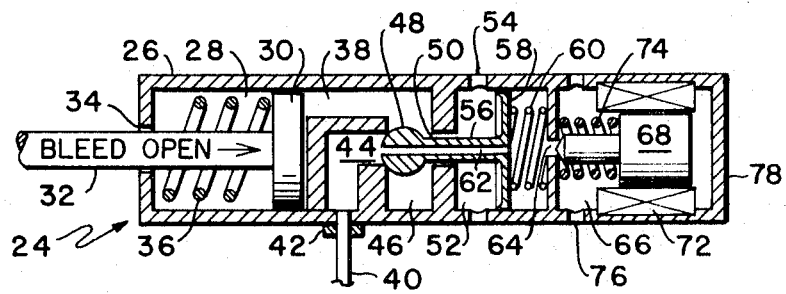
FIGS. 2 and 3 are longitudinal section views of the actuator shown in FIG. 1, illustrating different operating positions of the actuator.

As the engine-operating level is increased and the output shaft r.p.m. increases, the alternator 80 puts out sufficient power to energize the solenoid 72 and displace the plunger 68 against port 64, as shown in FIG. 2. In this condition the pressures on opposite sides of the flow control valve element are equalized since the area of the piston portion 58 greatly exceeds the area of the spherical portion 48. The resultant pressure force acts in a direction to maintain the spherical portion 48 against inlet port 44. This condition will be maintained even when the pressure level of the air in conduit 40 reaches a level where it would be capable of displacing piston 30 to a bleed-closed condition.

Figure 3:
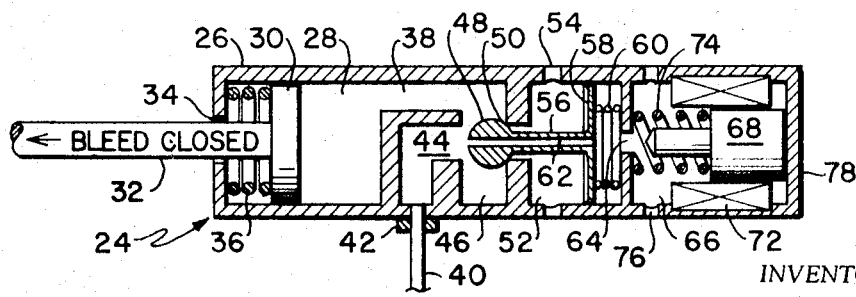

As the engine attains normal operating speeds, it is necessary to close the bleed band 22. To achieve this condition the solenoid 72 is deenergized enabling the plunger 68 to displace away from port 64. A bleed flow path through passageway 62 is permitted, thereby creating a substantial pressure differential across the flow control valve element. As a result, the pressure in inlet port 44 acts against spherical portion 48 to urge it against port 50, as shown in FIG. 3. This permits flow of pressurized air from inlet 44 through port 38 to chamber 28, thereby displacing piston 30 to a bleed-closed position.

It should be noted that the available pressure in inlet port 44 is extremely high and that the displacement of the spherical portion 48 between inlet port 44 and the discharge port 50 is relatively short. These conditions cause the flow control valve to act like a bistable valve so that it rapidly moves from one position to the other. The bleed band 22 will be closed during normal operating conditions as long as the solenoid 72 is deenergized.

When it is necessary to open the bleed band, as during acceleration, the solenoid 72 is energized to place the plunger 68 against port 64 to terminate bleed flow. This causes pressures on opposite sides of the valve to equalize, thus urging the head portion 48 against inlet port 44, as shown in FIG. 2.

It is apparent from the description of the operation of the valve embodying the present invention that a reverse logic is provided. During low operating conditions the a absence of a control input signal results in a bleed open condition the absence of a control input signal results in a bleed open condition. On the other hand, during normal engine-operating conditions, the absence of a control input signal results in a bleed-closed position. This reversal in logic enables the actuator to function efficiently for all engine conditions. During low operating conditions when there is insufficient electrical power to provide a bleed open signal the actuator maintains a bleed open condition to prevent compressor surge.

During normal operating conditions, however, the actuator, in the absence of an electrical signal, maintains the band in a bleed-closed position. This is necessary because the a absence of electrical power, for example due to a failure of the alternator or other component, requires that the engine be maintained at full power for the emergency condition. Maintaining the bleed valve in a closed position for this condition makes available a maximum of engine power even though an operator must judiciously operate the engine to avoid compressor surge.

It can be seen that the above actuator provides a highly effective and efficient means of controlling the operation of a bleed valve in a gas turbine engine.

Having described the invention, what I claim as novel and desire to be secured by Letters Patent of the United States is:

1. In a gas turbine engine having a multistage air compressor operable at varying flow conditions and an interstage bleed valve for intermittently discharging air to eliminate surge, an actuator assembly comprising:
   a housing having a first chamber therein;
   a power piston displaceable in said chamber and being connected to said bleed valve so that when said piston is in a first position said interstage bleed valve is closed and when said piston is in a second position the interstage bleed valve is open;
   means acting on one face of said piston for yieldably urging said power piston to said second position, thereby biasing said bleed valve to an open position;
   a passageway for providing a flow path of pressurized air from the discharge of said compressor to the opposite face of said piston in opposition to said biasing means;
   a valve element positioned in said passageway for selectively blocking and permitting the flow of pressurized air to said power piston;
   means positioned in said housing and responsive to exterior control inputs for selectively displacing said valve element between said flow-permitting condition and said flow-blocking condition, said selective displacing means being adapted, in the absence of a control input, to maintain said valve element in a flow-blocking condition for relatively low levels of compressor discharge pressure and to maintain said valve in a flow-permitting condition for relatively high levels of compressor discharge pressure.

2. An actuator assembly as in claim 1 wherein:
   said housing has a second chamber;
   said valve element is displaceable between an upstream position for blocking flow through said passageway and a downstream position wherein flow is permitted;
   said selective displacing means comprises:
   a piston portion extending from said valve element and displaceable in said second chamber;
   means for yieldably urging said piston portion in a direction to cause said valve element to block pressurized flow to said power piston;
   means for providing a restricted flow path from the upstream end of said valve element to one side of said piston portion thereby providing a bleed flow of pressurized air to one end of said second chamber;
   valve means for permitting flow from the said end of the second chamber to a low-pressure discharge and responsive to said exterior control input for selectively blocking bleed flow.

3. An actuator assembly as in claim 2 wherein said valve means comprises a pilot solenoid valve adapted to block bleed flow from said second chamber in response to an electrical signal.

4. An actuator as in claim 3 wherein said pilot solenoid valve is yieldably urged towards a position which permits bleed flow in the absence of an exterior electrical signal.

5. An actuator as in claim 1 wherein:
   said passageway has an inlet extending to a central chamber and a first outlet extending from said chamber to the one face of said power piston and a second outlet extending to a low-pressure discharge;
   said valve element is bistable in two closely spaced positions, the first of which permits flow from the inlet to the first outlet and the second of which blocks flow from said inlet and permits flow from said first outlet to said second outlet.

6. An actuator as in claim 5 wherein:
   said first inlet and said second outlet are in line with one another;
   said valve element comprises a spherical portion positioned between the inlet and the second outlet and a stem portion extending from the spherical portion through said second outlet, said spherical portion being selectively displaceable against the inlet and the second outlet.

7. An actuator assembly as in claim 6 wherein:

said housing has a second chamber;

said valve element is displaceable between an upstream position for blocking flow through said passageway and a down stream position wherein flow is permitted;

said selective displacing means comprises:

a piston portion extending from said valve element and displaceable in said second chamber;

means for yieldably urging said piston portion in a direction to cause said valve element to block pressurized flow to said power piston;

means for providing a restrictive flow path from the upstream end of said valve element to one side of said piston portion thereby providing a bleed flow of pressurized air to one end of said second chamber;

valve means for permitting flow from the said end of the second chamber to a low-pressure discharge and responsive to said exterior control input for selectively blocking bleed flow.

8. An actuator assembly as in claim 7 wherein said valve means comprises a pilot solenoid valve adapted to block bleed flow from said second chamber in response to an electrical signal, said solenoid valve being yieldably urged towards a position which permits bleed flow in the absence of an exterior electrical signal.